(12) United States Patent
Barry (10) Patent No.: US 7,440,560 B1
(45) Date of Patent: Oct. 21, 2008

(54) SCHEMA FOR EMPIRICAL-BASED REMOTE-ACCESS INTERNET CONNECTION

(75) Inventor: Jon Barry, Hillsborough County, FL (US)

(73) Assignee: AT&T Corp., New York, NY (US)

( * ) Notice: Subject to any disclaimer, the term of this patent is extended or adjusted under 35 U.S.C. 154(b) by 579 days.

(21) Appl. No.: 10/988,895

(22) Filed: Nov. 15, 2004

Related U.S. Application Data

(60) Provisional application No. 60/520,764, filed on Nov. 17, 2003, provisional application No. 60/520,770, filed on Nov. 17, 2003.

(51) Int. Cl.
*H04M 3/42* (2006.01)

(52) U.S. Cl. ............................ 379/201.01; 707/3; 707/4

(58) Field of Classification Search ............ 379/201.01; 707/3, 4
See application file for complete search history.

(56) References Cited

U.S. PATENT DOCUMENTS

| | | | |
|---|---|---|---|
| 6,028,867 A | 2/2000 | Rawson et al. | |
| 6,263,363 B1 | 7/2001 | Rosenblatt et al. | |
| 6,275,939 B1 | 8/2001 | Garrison | |
| 6,483,904 B1 | 11/2002 | Yucebay | |
| 6,738,815 B1 | 5/2004 | Willis, Jr. et al. | |
| 6,775,559 B1 | 8/2004 | Weghorst et al. | |
| 7,242,950 B2 * | 7/2007 | Suryanarayana et al. . | 455/456.5 |
| 2002/0059453 A1 * | 5/2002 | Eriksson et al. ............. | 709/238 |
| 2002/0069355 A1 | 6/2002 | Garrison | |
| 2003/0140121 A1 * | 7/2003 | Adams ....................... | 709/219 |
| 2004/0057435 A1 | 3/2004 | Ruyle et al. | |

* cited by examiner

*Primary Examiner*—Quynh H Nguyen (57) ABSTRACT

A method and system for automatically providing access options to a remote user of a data network that utilizes a network-based connection analysis server to determine the "best available" connection arrangement to provide access for the remote user. The connection analysis server contains a database of empirical access/connection data based on the past experience of user's attempting to connection to remotely-located data networks (for example, success of connection, speed of connection, cost, etc.). The server initiates the inventive process by querying the remote user for geographic location information, determining access options available at the responded geographic location by comparing the geographic location to the empirical data, and then selecting a "best available" connection option (or options) to the remote user for approval.

11 Claims, 8 Drawing Sheets

| OUTBOUND TELEPHONE NUMBER | CONNECTION TYPE (DIAL, WiFi, B-band..) | INBOUND TELEPHONE NUMBER | DIAL PREFIXES, DIAL CODES | TIME OF DAY | BATTERY POWERED? |
|---|---|---|---|---|---|
| | | | | | |
| | | | | | |
| | | | | | |
| | | | | | |

SCHEMA FOR EMPIRICAL-BASED REMOTE-ACCESS INTERNET CONNECTION

CROSS-REFERENCE TO RELATED APPLICATIONS

This application claims the priority benefit of U.S. Provisional Applications 60/520,764 and 60/520,770, both filed on Nov. 17, 2003.

TECHNICAL FIELD

The present invention relates to a process for accessing an Internet Protocol (IP) network from a remote location and, more particularly, to an empirical approach for automatically searching through alternative access methods and presenting one or more connection options to a remote user.

BACKGROUND OF THE INVENTION

"Remote access" generally refers to the ability of a user to access a remote system using a local system (e.g., a personal computer). The remote system may either be a stand-alone system or a network of systems. A network of systems may include, for example, printers, modems, servers, computer systems, telecommunications equipment, etc. Remote access is commonly referred to as "Internet access" when a local system accesses a remote network of systems such as what is known as the worldwide web.

Remote access typically requires transferring digital data between a local system and a remote system. Several applications and/or services with varying degrees of complexity can be provided by using a remote access feature. Electronic mail, web browsing, distributed database applications and electronic commerce are but a few examples of such applications and services.

To gain access to a computer network from a remote location, a computer user with a telephone modem can use the Public Switched Telephone Network (PSTN) to establish a telephone connection to a dial-up telephone line providing access to the computer network. However, an individual who is often working away from the office may struggle to configure his/her remote access software to properly connect their laptop (or other portable computer/communication device) to the Internet or their company's private intranet. The mechanics of providing a connection between a remote device and a communication network becomes even more problematic when the individual is traveling to unfamiliar locations. Confusing dialing rules (e.g., international dialing, dialing prefixes, 7-digit versus 10-digit dialing, dialing an extra digit for an outside line), coupled with often not knowing a local dial-in number for the person's Internet service provider (ISP) or the various connecting options (broadband, WiFi hotspots, cellular, etc.) adds to this confusion. In addition, a traveling computer user often tries to minimize their connection costs (e.g., long distance charges, roaming charges, etc.) while also desiring to maximize their connection performance (e.g., speed, responsivity).

The currently available "remote access" software requires the remote user to "select and configure how you would like to connect" to the network. To establish an Internet connection, the remote user may use analog dial-up, ISDN, DSL, cable modem, wireless, cellular or even satellite connections. Each of these connection types requires configurations within the remote computer, where the settings often vary by location. For example, a hotel usually requires a dial prefix to obtain dial tone, wireless hotspots will require a particular computer ID (service set identification—SSID). There may be times when the user does not want to spend the time figuring out the "best" way to connect their computers to the network from an unfamiliar location, particularly in light of these various connection options (where each option may be associated with a different cost and/or responsivity).

All of these factors combine to make the process of remote connection to a network a challenging task for most users, who would prefer to have the "optimal" connection automatically chosen for them.

SUMMARY OF THE INVENTION

The need remaining in the prior art is addressed by the present invention, which relates to a process for accessing an Internet Protocol (IP) network from a remote location and, more particularly, to an empirical approach for automatically searching through alternative access methods and presenting one or more connection options to a remote user.

In accordance with the present invention, a network-based connection analysis server is used to generate and store empirical data of actual user experiences in attempting to access an IP network from various locations (at various times of day, using various connection media, etc.). This empirical data and associated software (referred to as an "access module") can then be downloaded by a user. Therefore, when a user arrives at a "remote" location, the downloaded access module will prompt the remote user with a question such as "where are you?". In response, the remote user enters his/her location (for example, calling line telephone number or geographic location) and the access module the compares this information to the downloaded empirical data to select/prioritize the optimum connection alternative(s). The selected alternative(s) is/are then presented to the remote user, who makes the final choice and the connection process is initiated.

In an alternative embodiment of the present invention, a rules-based logic element may be included within the mobile device and utilized in place of the empirical data to prioritize both the device's connection capabilities and the network connection capabilities of the remote location. For example, a laptop computer may include a LAN adapter, where it is preferred to connect via a LAN over a dial-up connection. The user's current location (the "remote" location with respect to the computer network) may include a WiFi hotspot and the laptop may include a WiFi adapter. The access methodology may then determine that a WiFi connection is the best match. The chain of connection methods may be ranked from long distance dial-up being the least desirable to a LAN connection being the most desirable.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
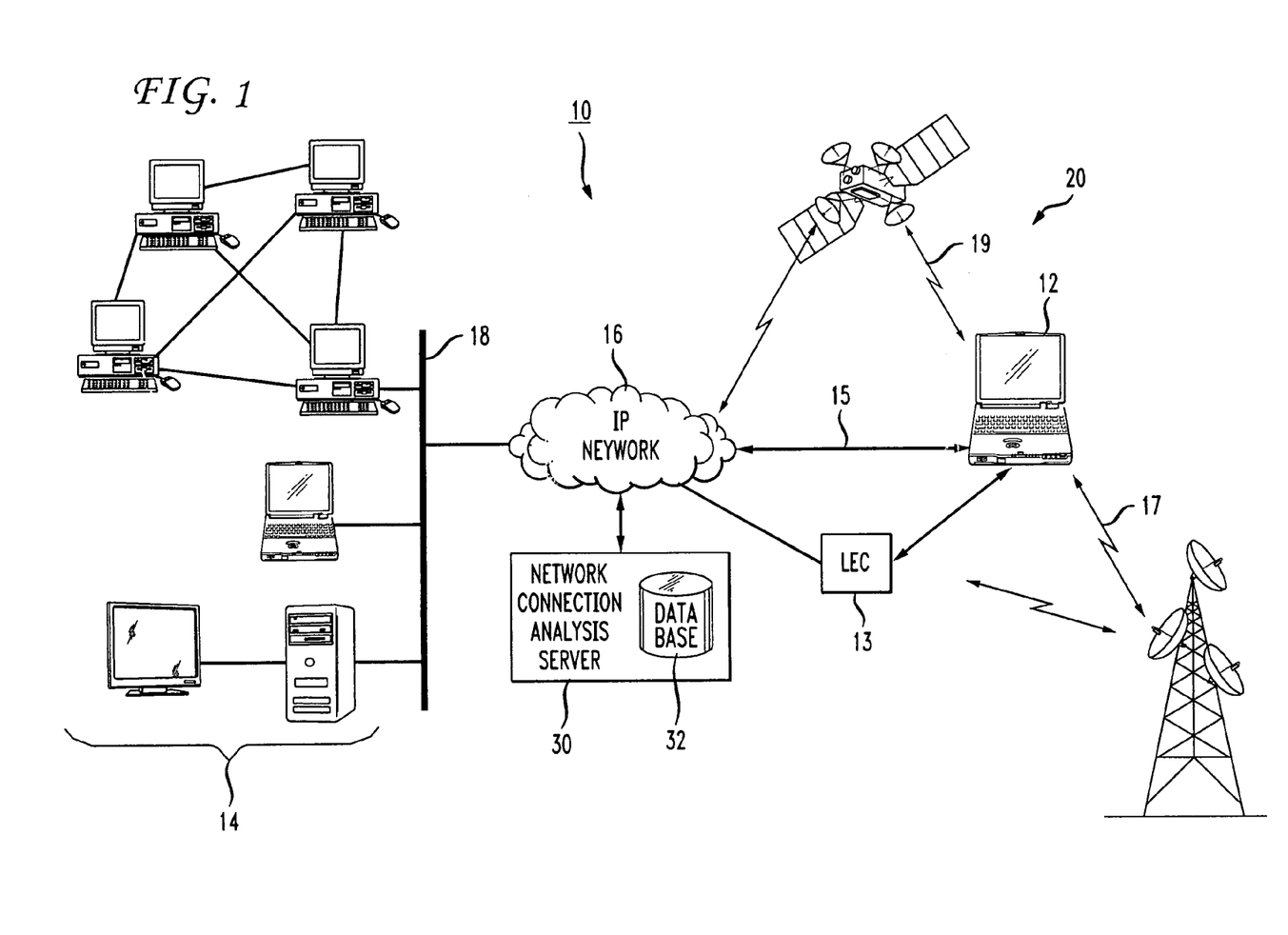
FIG. 1 illustrates an exemplary network arrangement for implementing the first embodiment of the present invention.

FIG. 1 contains a network architecture 10 that is capable of supporting "remote access" of a data network (such as the Internet or a private/corporate intranet) through a user's computing device at a location where a "direct connection" is impossible. For example, a person may be traveling on business and wish to access his/her email and other files resident on a computer system back at the office. In architecture 10 as illustrated in FIG. 1, this embodiment takes the form of an individual's laptop computer 12 being at a location 20 that is "remote" with respect to an office location 14. As shown, office location 14 may comprise a plurality of different computing devices, where a number of these devices may themselves be connected to form a private network at the office location. An IP network 16 is disposed between laptop 12 and office network 14, where laptop 12 may be configured, in accordance with the present invention, to access office network 14 directly from his remote location 20.

In this particular arrangement as illustrated in FIG. 1, a local area network (LAN) 18 is shown as connected to network 14. The appearance of a LAN 18 at network 14 is considered to be exemplary only, and may (perhaps) be a LAN at a college or other commercial location. Various connection possibilities are illustrated as associated with remote location 20, such as dial-up through a local switch (LEC) 13, a cable connection 15, a wireless connection 17, or even a satellite connection 19.

In accordance with the teachings of the present invention, a network connection analysis server 30 is illustrated as disposed within architecture 10 so as to be coupled to IP network 16. Network connection analysis server 30 includes a database 32 of empirical data defining, in specific terms, the past experiences (successes, failures, connection quality, etc.) of users attempting to initiate remote network connections. It is a significant aspect of the present invention that a remote user's connection process will be based upon this empirical data, thus providing a relatively strong likelihood that a selected access method will be successful, without requiring the remote user to have any a priori knowledge of the access options at his/her remote location. Network connection analysis server 30 further comprises the computing abilities so as to apply various statistical and heuristic models for analyzing this collected empirical data. For example, connections may be scored based on popularity, connection success rate, connection cost/speed/etc. Reverse number look-up may be used to link a telephone number with a specific geographic location. Prior to leaving the office (or other location having a direct connection to the user's network), the user may then download this empirical data and associated analysis software (hereinafter referred to as an "access module") to be implemented when the user reaches a remote location.

Figure 2:
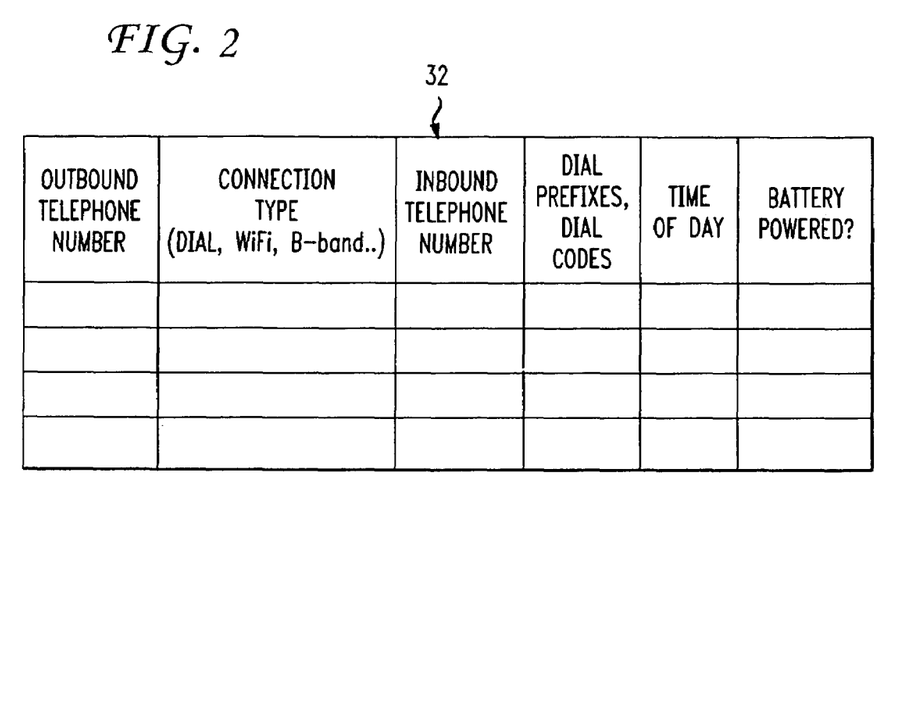
FIG. 2 contains an exemplary table for storing the empirical data collected within the network connection analysis server.

FIG. 2 contains an exemplary arrangement for database 32 that may be used to store empirical data within network connection analysis server 30 in accordance with the present invention, where this data is associated with the past experiences of a plurality of users attempting to remotely access various networks. In the exemplary arrangement of FIG. 2, database 32 is shown as storing information such as, for example: (1) the phone number from which the user is dialing into the network (which may either be entered by the user or derived from caller ID information); (2) the type of connection (i.e., dial, WiFi, broadband, cellular, ISDN, etc.); (3) the location to which the user is connecting; (4) dial prefixes or other properties required to make the connection (i.e., international dialing codes); (5) time of day; (6) whether or not the computer is running on battery power. It is to be understood that at least some of this data is exemplary only, and various other parameters may be included in the tabular listing of empirical data.

Figure 3:
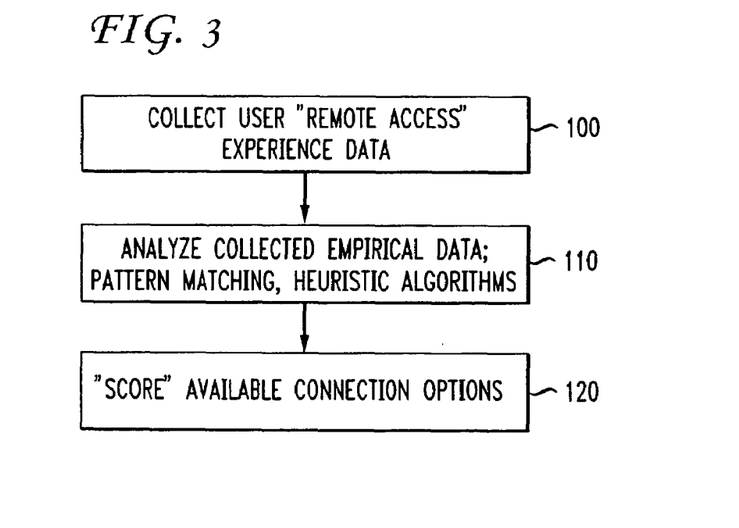
FIG. 3 is a flowchart for an exemplary process of populating the empirical data database.

In accordance with the present invention, network connection analysis server 30 functions, as illustrated by the flowchart of FIG. 3, to perform various statistical analyses on this collected empirical data. As shown, the analysis process begins (step 100) with collecting a sufficient amount of "experience data" from a number of different users so that this empirical data may be used to provide a meaningful analysis. Once the information is collected, pattern analysis and various other appropriate heuristic algorithms are employed (step 110) to analyze the overall users' experience in attempting remote access. The connections may be scored, as mentioned above, based on popularity, connection success rate, connection speed, cost and other similar criteria (step 120). Additionally, reverse phone number look-ups may be used to assign meaningful names to the locations from where the remote users are attempting to access the network.

The statistically analyzed information collected within network connection analysis server 30 is then available for a user to access and download into his/her mobile computing device 12. For example, before leaving a home office location 14 in New York, a sales representative may access network connection analysis server 30 and download the empirical data and the associated statistical analysis information ("access module"). Once the sales representative reaches his remote location 20 (for example, Chicago), the downloaded access module may be initialized and used to determine the most appropriate remote access connection back to the network at the sales rep's home office.

Figure 4:
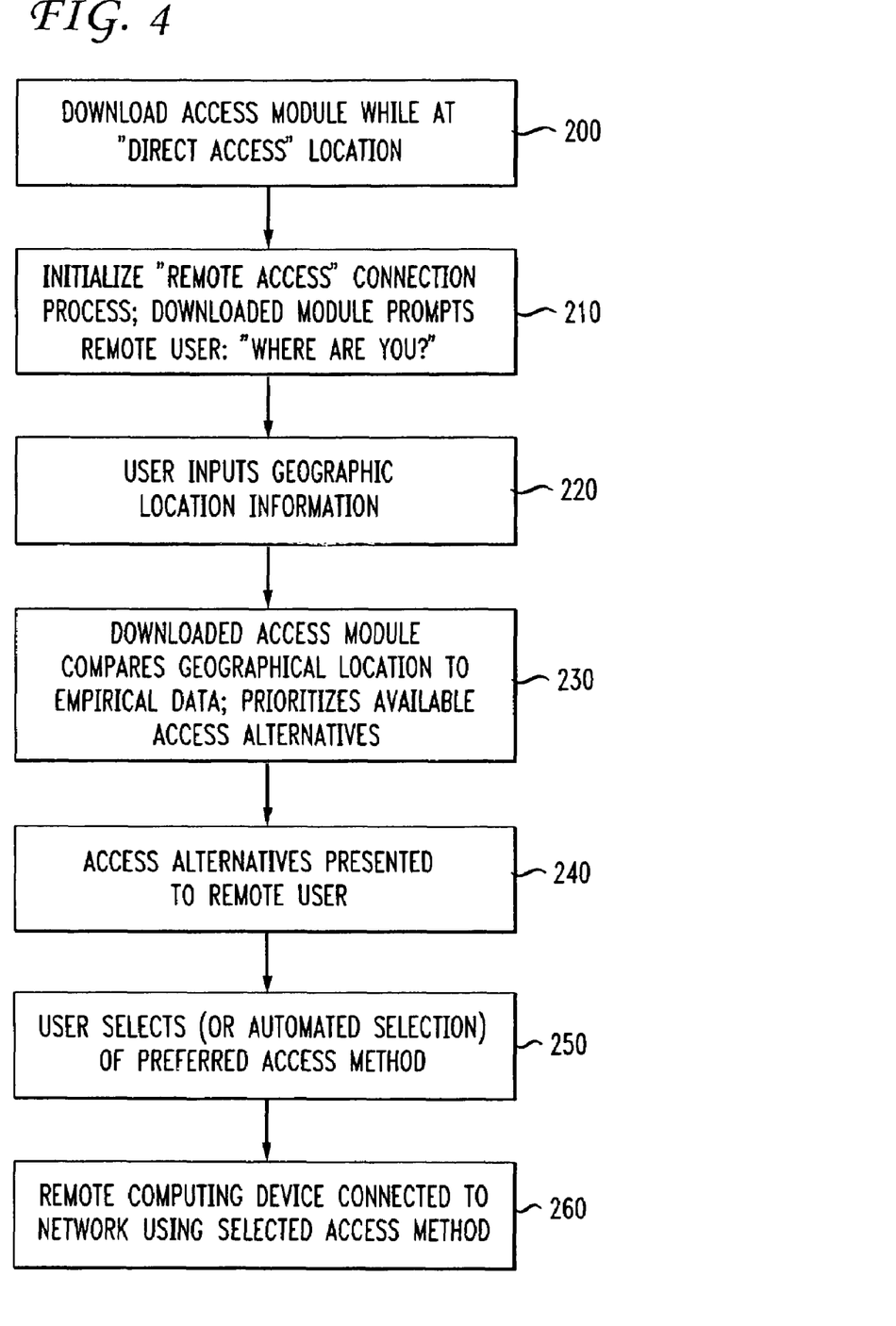
FIG. 4 is a flowchart of an exemplary process for utilizing the collected empirical data to determine an access connection arrangement for a specific remote location.

FIG. 4 contains a flowchart illustrating this particular process as it is performed in accordance with the present invention. Indeed, the process begins (step 200) in the manner mentioned above, with the user downloading the necessary information from network connection analysis server 30 prior to leaving the office/direct connection to the network 18. Once the user arrives at a remote location 20 and desires to connect to the home network 18, the downloaded access module will prompt the user to begin the process by asking for the current geographic location of the user (step 210). Indeed, this question may take the form of a prompt such as "where are you?". The user (or the user's computing device 12 if so equipped), then inputs geographic location information (220), which may take the form of a street address, building identification, local dialing number or the like. In accordance with the present invention, the access module then compares this geographic information with the analyzed empirical data that has been downloaded as part of the access module (step 230).

Based on the results of this comparison, one or more connection options are then presented to the user (step 240), where these options may include: (1) a WiFi hotspot that operates at a relatively high speed, but may be expensive and/or not secure; and (2) a dial-up connection that is relatively inexpensive and secure, but is also relatively slow (in terms of data rate). The user may then select the access method most appropriate for his current situation (step 250). In another embodiment of the present invention, the user's personal preferences in terms of, for example, speed, security, cost, etc. may be used as part of the statistical analysis of the empirical data so that the results presented to a specific user are tailored to his/her individual needs. As another alternative, the user's computing device may be configured to automatically select the highest priority alternative, without requiring the user to make the selection himself. Once the selection is made, the computing device then begins the initialization process to connect to the network (step 260).

This preferred embodiment of the present invention is unique in the way that it simplifies remote access configuration for traveling computer users. The inventive methodology is unique in that its recommendations are derived from actual user experiences (stored in the empirical information database 32) and need only ask the remote user "where are you?" to generate a listing of access alternatives.

Figure 5:
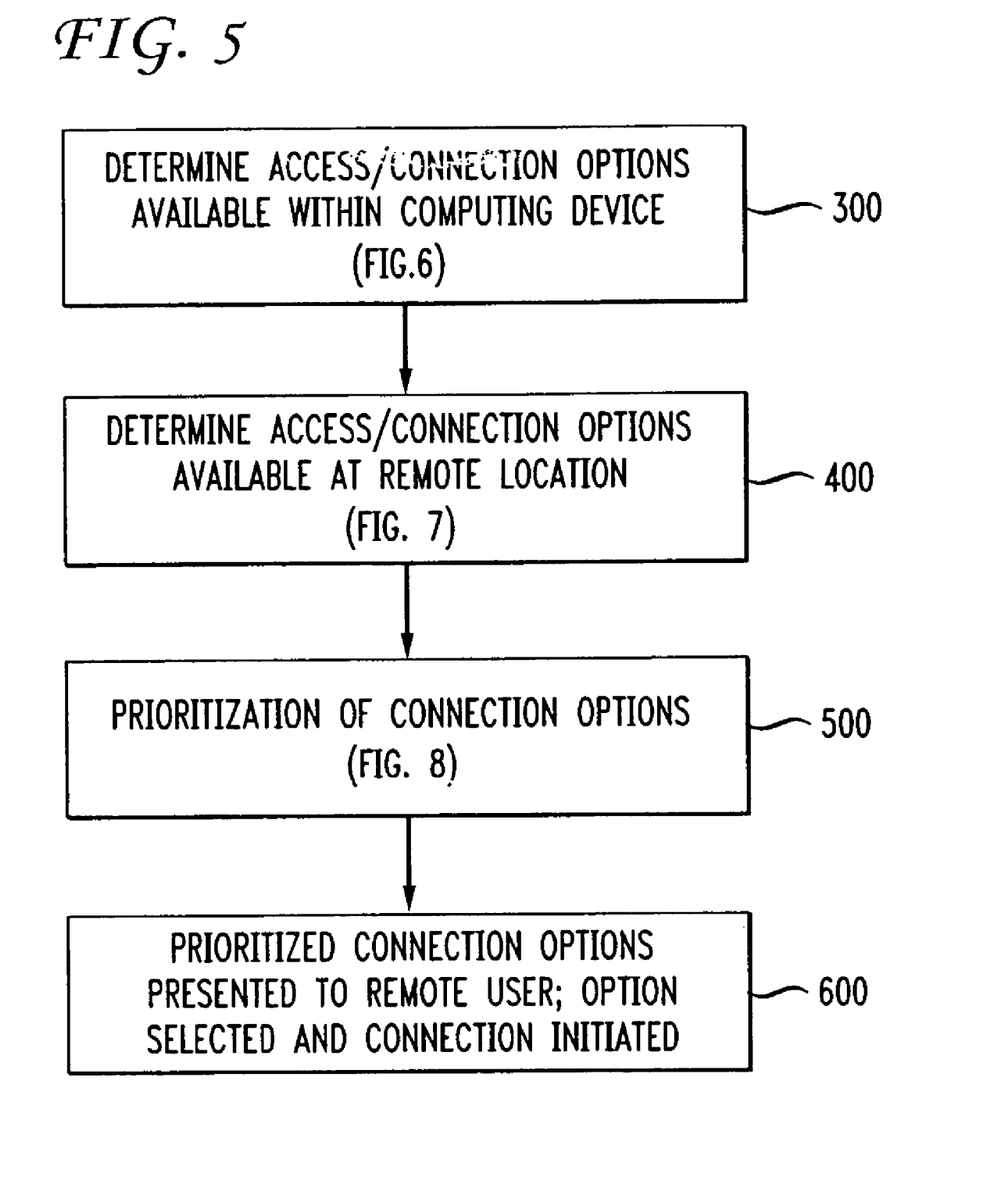
FIG. 5 contains a flowchart of an exemplary process for an alternative embodiment of the present invention.
Figure 6:
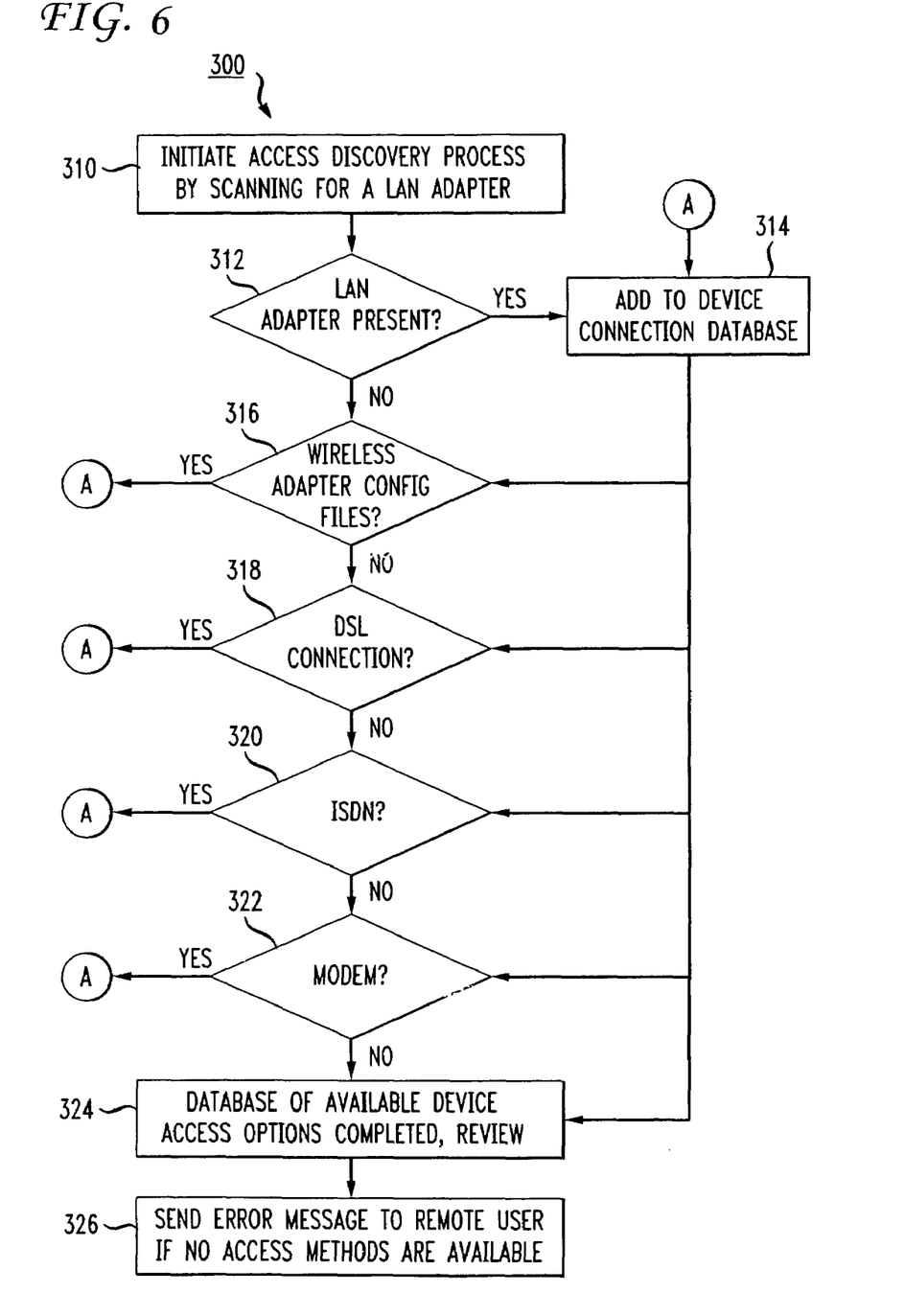
FIG. 6 contains a flowchart of an exemplary sequence of steps for determining the connection options available for a remote computing device, as illustrated in FIG. 5.

FIG. 5 contains a high level flowchart illustrating the general principles of an alternative access methodology of the present invention. As shown, the process begins (step 300) with determining the communication connection possibilities of the user's computing device itself (for example, a laptop), where this step is identified as "discover connection types available in remote access device". FIG. 6 contains a more detailed flowchart of a sequence of steps useful for this particular task and will be discussed in further detail hereinbelow. Referring back to FIG. 5, the overall process then proceeds to a determination of the communication connection capabilities of the remote location itself (step 400), where an exemplary sequence of steps to perform this task is outlined in FIG. 7.

Once the complete set of communication capabilities of both the computing device and the remote location have been established, the overall process continues by "prioritizing" the various connections (step 500), and how different combinations could be used to achieve the user's current needs. An exemplary prioritization scheme is discussed below in association with FIG. 8, with the scheme including such factors as: desired speed of connection, cost, security, reliability, etc. In one case, the user himself may dictate one or more of these parameters. Alternatively, this access methodology of the present invention may use rule-based logic to define the optimum connection arrangement. The prioritized listing is then presented to the user, and the remote computing device is configured (step 600), using the best available connection arrangement.

As mentioned above, FIG. 6 contains a detailed sequence of an exemplary set of steps that may be used to perform step 300 in ascertaining the connection capabilities of an exemplary remote device, such as remote device 12 illustrated in FIG. 1. Referring to FIG. 6, this exemplary sequence begins with the access methodology (preferably stored within the laptop itself) scanning the configuration files of remote device 12 to look for LAN adapter functionality (step 310). If such LAN functionality is found to be present (step 312), the LAN identity is recorded as "available" in a device connection database (step 314). The process continues with the methodology performing a scan for wireless adapter configuration files (step 316) where, if found, the presence of such files is added to the device connection database of step 314. Similarly, a scan is then performed to determine the presence of a DSL connection (step 318) where, if found, this connection is added to the database of step 314. Continuing, a scan is performed to search for a digital telephone line connection (ISDN), at step 320, with a determination of its presence and added to the database of step 314, if available. Lastly, a scan is made to determine the availability of an analog modem connection (step 322) where, if found, this connection is also added to the database of step 314.

It is to be understood that this process flow is exemplary only, and various other types of communication connections may be included or excluded from this listed. For example, a cable modem connection or satellite communication capability may be included in the search list. A LAN connection may be omitted if it is correctly understood that such a connection would not be possible for the specific type of device or location. Indeed, the set of process steps as outlined in the sequence of FIG. 6 is intended only to illustrate the principles of this alternative embodiment of the present invention. Referring again to FIG. 6, the process continues by a review of all of the various connection types available with remote device 12 (step 324). If it turns out that the database developed in step 314 does not contain any entries, an error message may be given to the user (step 326), alerting the user to the inability of this particular device to communicate with a data network.

Figure 7:
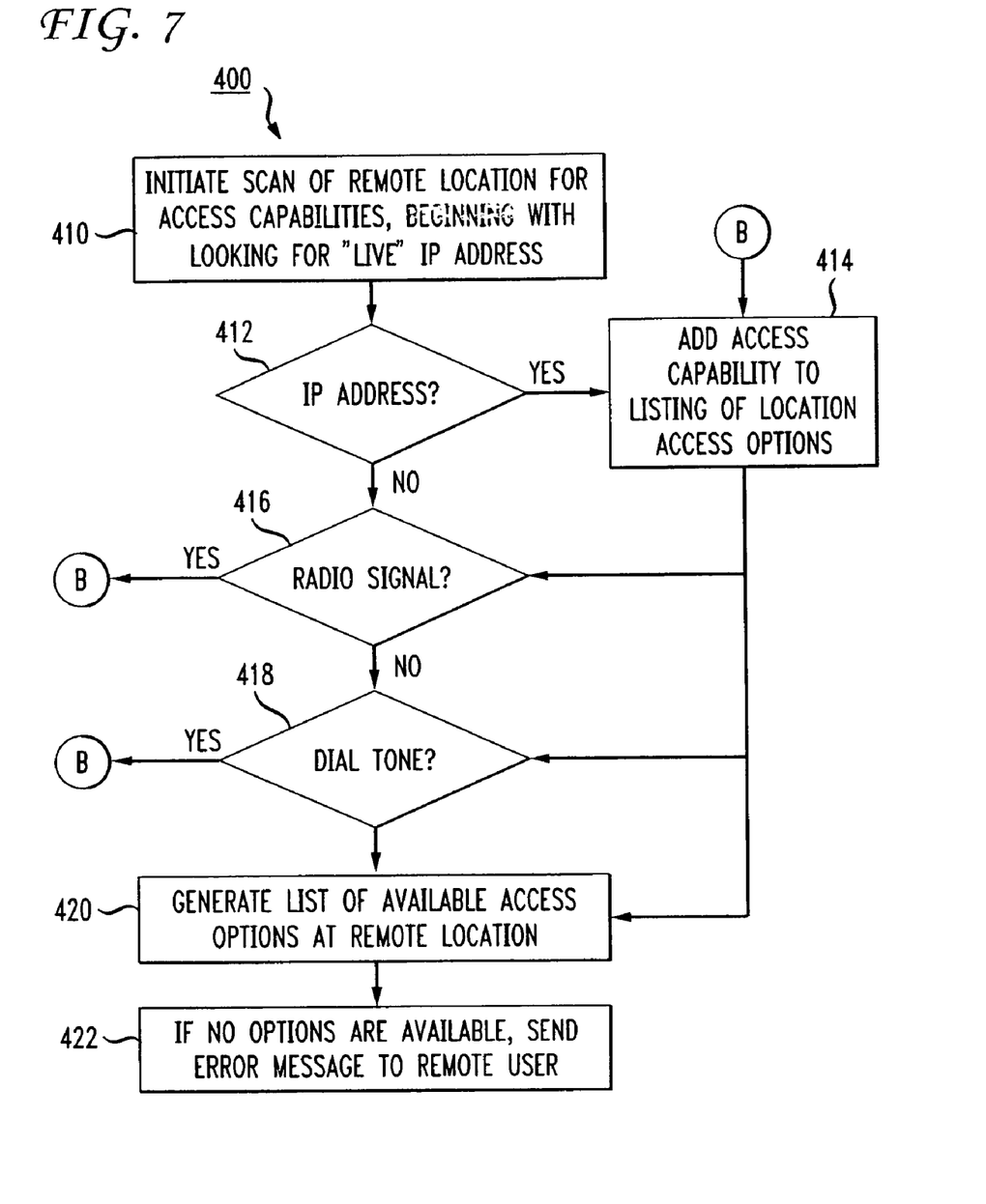
FIG. 7 contains a flowchart of an exemplary sequence of steps for determining the connection options available at the user's location, as illustrated in FIG. 5.

An exemplary process 400 for determining the connections available at the location (such as location 20 of FIG. 1) of remote computing device 12 is illustrated in FIG. 7. As with the sequence steps of FIG. 6, the process outlined in FIG. 7 is considered to be exemplary only, for the sake of illustration. Indeed, in implementing this alternative access methodology of the present invention, other sequences of scanning steps may be developed and/or used. Referring to FIG. 7, the exemplary process begins with scanning device 12 for an identifiable IP address (step 410). A decision is made regarding the presence of an IP address (step 412), where if such an address is found, it can be presumed that a "live" LAN connection already exists. This LAN location information is then recorded in a database of potential location connections (step 414). The process continues with a scan to ascertain the presence of a radio signal (step 416). Upon a positive determination of the presence of a radio signal, the connection database is updated to designate the presence of wireless (WiFi) capability (e.g., that a hotspot is within range). A test is next performed to determine if the modem in device 12 can "hear" a dialtone (step 418). If dialtone is present, telephonic connections may be added to the connection possibilities. Other tests may be performed (not included in the flowchart of FIG. 6) to determine the presence of different types of telephone line capabilities. Tests for the presence of cable modem connections and/or satellite communication capabilities may also be performed. Once the entire list of tests is completed, the process concludes by generating a listing of all available connection possibilities at that location (step 420). If no connection possibilities are found, an error message may be sent to the user (step 422) stating that "no communication connections are available at this location".

Figure 8:
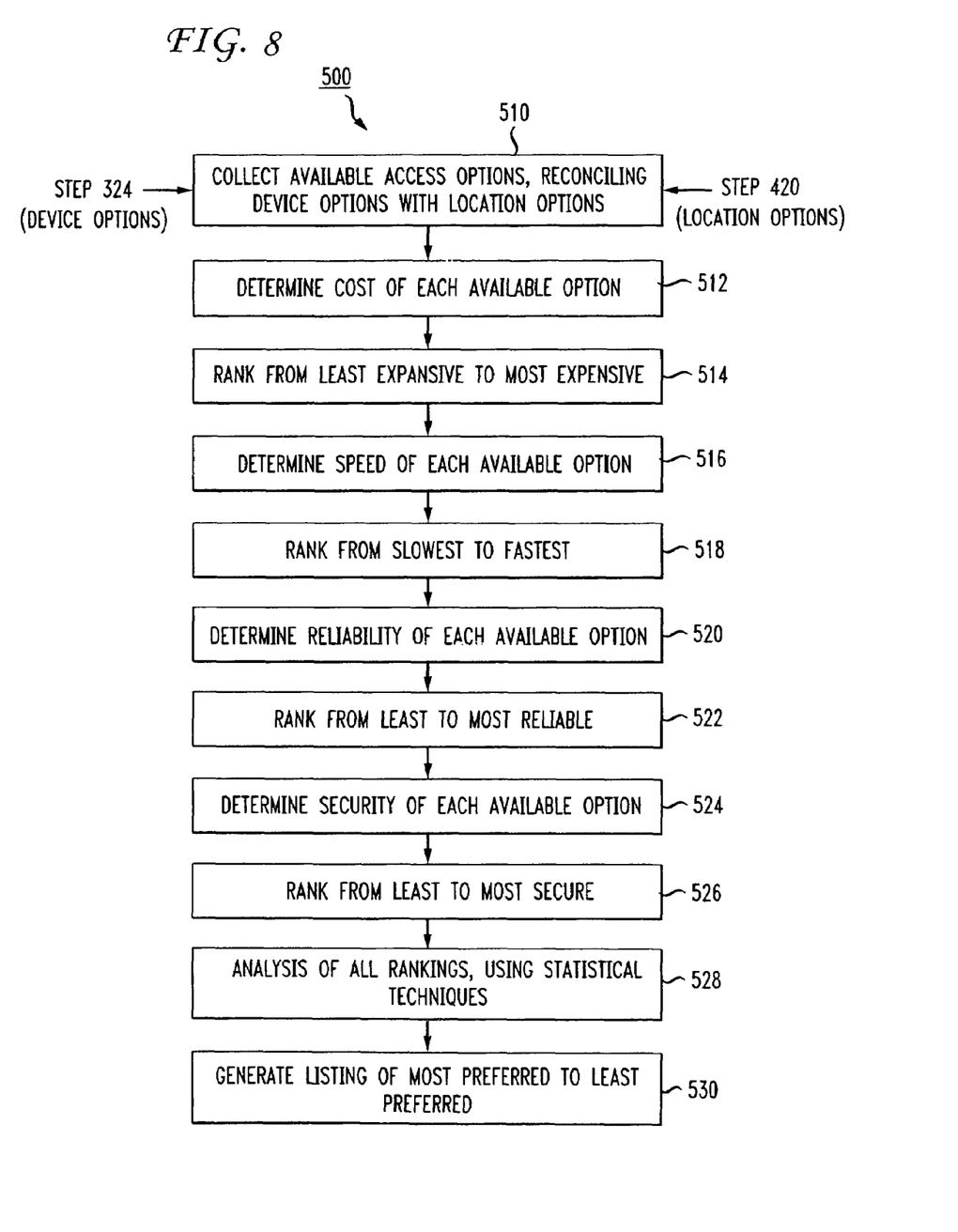
FIG. 8 is a flowchart illustrating a sequence of steps for prioritizing the various connection possibilities for the user at the remote location with the user's computing device, as illustrated in FIG. 5.

FIG. 8 contains an exemplary, simplified process flow associated with performing the prioritization of connections as discussed above in association with step 500 in the flowchart of FIG. 5. Again, as with the flowcharts of FIGS. 6 and 7, the sequence of steps as found in the flowchart of FIG. 8 are considered to be exemplary only, and various other steps and processes may be used to develop a ranking of the various connection possibilities for a particular remote communication device at a particular location "remote" from a network.

Referring to FIG. 8, the prioritization process 500 begins with the listing of device connection capabilities from step 324 of process 300 and the location connection capabilities from step 420 of process 400. Various factors may then be considered in ranking each potential and available connection arrangement. In the sequence as outlined in FIG. 8, the first step (step 510) is to reconcile the list of available device attributes with the list of location-specific connection types, generating a listing of "available connection combinations". This list of available connection combinations is then assessed against a variety of different factors. For example, the cost of each available connection combination may be determined (step 512) and a ranking developed from least cost to most expensive (step 514). If connection speed (data rate) is a concern (step 516), a listing can be developed (step 518) defining, for example, the slowest to the fastest connection arrangements. Reliability factors of connection types can be assessed (step 520), and a prioritization can be made from least to most reliable (step 522). A security ranking is performed as step 524 in this example, with a listing developed (step 526) of "least secure" to "most secure".

Once all of these various parameters have been analyzed for the current set-up, an analysis is performed (step 528), using well-known techniques for manipulating such types of data, to generate a listing of most-preferred to least-preferred connection arrangements (step 530). It is to be understood that various implementations of the present invention may use input from the user himself in "weighting" the importance of each attribute. For example, one user may want the fastest connection, regardless of cost. Another user may require the most secure connection, regardless of how slow the data rate of the connection may be. All of these factors will be involved in developing the listing of connections and determining the "best available connection", as noted in step 530.

Figure 9:
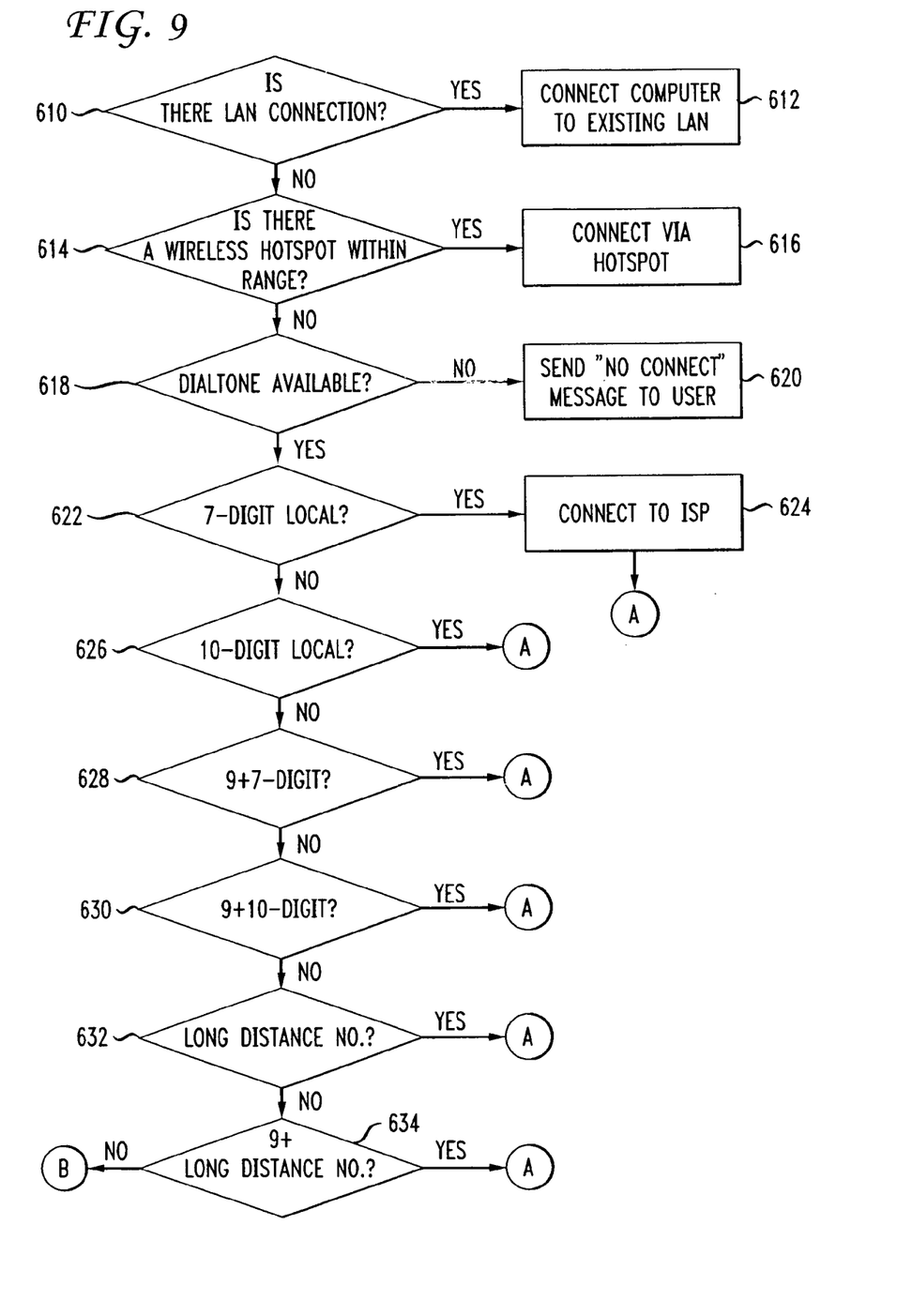
FIG. 9 is a flowchart of an exemplary process for determining a connection option for a device at a remote access location.

FIG. 9 contains a flowchart illustrating one exemplary process for implementing the remote access connection selection process in accordance with this alternative embodiment of the present invention. For the purposes of this example, it is presumed that the remote access device includes a LAN adapter, a WiFi adapter and an analog modem. The selection process then begins (step 610) with a determination of LAN availability (that is, is there an IP address present at the device). If a LAN connection exists, the determination is made to connect this remote computing device to the existing LAN (step 612). If no IP address is found (and, therefore, no LAN exists at that location), a determination is made regarding the presence of a wireless hotspot (step 614). If a radio signal is present, indicating that the wireless adapter in the device can "hear" signals from a wireless hotspot, then the communication connect is made via that hotspot (step 616).

If there is no local hotspot within the communication zone, the process continues with checking for dialtone at the analog modem (step 618). If no dialtone is detected, an error message is sent to the user (step 620), stating something like "no connections available at this location". Presuming that dialtone is detected, the process continues (in this particular example) with the access process attempting to dial a 7-digit local number (associated with the user's Internet service provider (ISP) to make the connection (step 622). If successful, the connection is made and the user is connected to his/her ISP (step 624). If a 7-digit call is not completed, the process will add the NPA prefix for that same local call and attempt to connect to the ISP by using the 10-digit local number (step 626). If this is unsuccessful, the process will attempt to prefix the 7-digit call with a "9" (step 628), employing the presumption that the user may be at a location that requires an individual to first dial "9" to obtain an outside line (in a hotel or office location, for example). This step may be repeated by prefixing the 10-digit local number with a "9" (step 630) if the 9+7-digit is unsuccessful. Continuing, if a local call does not go through, the process may attempt (step 632) a connection using a long distance number (or a "toll free" number), then prefixing the long distance number with a "9" if required (step 634).

The process as outlined in FIG. 9 is considered to be exemplary only, providing a specific implementation of one set of steps that may be used to develop a sequence for providing a network connection using the access methodology of the present invention. It is to be understood that there exist various other sequences that may easily be employed by one skilled in the art, depending on the particular requirements of the user, the attributes of the remote computing device and/or the connection possibilities at the remote location.

Indeed, while various embodiments of the present invention have been described above, it is to be understood that these embodiments have been presented by way of example only, and not limitation. Thus, the breadth and scope of the present invention should not be considered as limited by any of the above-described embodiments, but should be defined only in accordance with the following claims.

What is claimed is:

1. A method of automatically providing access options to a remote user of a data network, the method comprising the steps of:
   building a network-based empirical database of users' past experiences in attempting to access data networks from remote locations;
   querying a remote user of a computing device for geographic location information;
   determining access options available at the responded geographic location;
   analyzing the available access options in conjunction with the information stored in the network-based empirical database to generate a prioritized list of alternatives; and
   selecting an access option from the prioritized list for utilization by the remote user's computing device.

2. The method as defined in claim 1, wherein the method includes the step of:
   downloading the empirical database to the computing device.

3. The method as defined in claim 1, wherein in performing the step of building a database, the method requests one or more of the following types of data from a user: outbound telephone number, connection type, inbound telephone number, necessity for dial prefixes and time of day.

4. The method as defined in claim 3, wherein the connection type comprises one or more of: dial-up connection, WiFi connection, cable connection, ISDN connection, DSL connection and satellite connection.

5. The method as defined in claim 1, wherein the analyzing step includes the steps of:
   reviewing the geographic location information supplied by the remote user; and
   comparing the geographic location information to the empirical data downloaded from the network-based empirical database.

6. The method as defined in claim 5, wherein the analyzing step further includes the steps of:
   performing statistical analyses of the empirical data and geographic location information; and
   developing a prioritized list of access options based upon the statistical analyses.

7. The method as defined in claim 1, wherein the step of querying the remote user is performed by a client element embedded within the remote user's computing device.

8. The method as defined in claim 1, wherein the step of determining access options includes the steps of:
   discovering various access options usable by the remote user's computing device;
   discovering various access options available at the remote user's geographic location;
   determining a list of access options available by comparing the discovered computing device options and the discovered geographic location options;
   applying a rule-based approach to prioritize the determined list of access options;
   selecting a preferred access option for the remote end user; and
   downloading required information to the end user to affect the selected preferred access option.

9. A system for implementing access to a local area network by a remotely-located computing device, the system comprising
   a connection between the remotely-located computing device and a data communications network;
   a connection between the local area network and the data communication network; and
   a network connection analysis server coupled to the data communication network, the network connection analysis server including a database of empirical information on past connection arrangements and an analysis module for determining the geographic location of the remotely-located computing device and comparing the determined geographic location to the empirical information to develop a prioritized list of access alternatives for connecting the remotely-located computing device to the local area network.

10. The system as defined in claim 9, wherein the network connection analysis server includes a module for prompting a remotely-located computing device for information indicative of its geographic location, including the telephone number associated with a dial-in capability of the remotely-located computing device.

11. The system as defined in claim 10, wherein the prompted-for information includes a dial-out number associated with the data network system, type of connection preferred and any required dial prefixes.

* * * * *